United States Patent
Ramser et al.

(10) Patent No.: US 6,301,610 B1
(45) Date of Patent: Oct. 9, 2001

(54) COMMUNICATION SYSTEM (75) Inventors: Stephen F. Ramser, Upper St. Clair; Andy L. Davenport, Leechburg, both of PA (US)

(73) Assignee: Union Switch & Signal, Inc., Pittsburgh, PA (US)

(*) Notice: Subject to any disclaimer, the term of this patent is extended or adjusted under 35 U.S.C. 154(b) by 0 days.

(21) Appl. No.: 09/502,386

(22) Filed: Feb. 11, 2000

(51) Int. Cl.[7] ................................................. G06F 13/38

(52) U.S. Cl. ............................................. 709/208; 714/18

(58) Field of Search ................................. 709/208; 714/18

(56) References Cited

U.S. PATENT DOCUMENTS

| | | |
|---|---|---|
| 5,142,623 | 8/1992 | Staab et al. . |
| 5,864,680 | 1/1999 | Edblad et al. . |
| 6,208,761 * | 3/2001 | Passaggio et al. ............... 382/236 |
| 6,216,038 * | 4/2001 | Hartaub et al. ................... 607/31 |
| 6,216,177 * | 4/2001 | Maris et al. ....................... 710/6 |

OTHER PUBLICATIONS

Houser, Kirk D., "Data Highway Provides Database Management", *Computer Design*, Nov. 1983, pp. 118–120, 122, 124 and 125.

* cited by examiner

*Primary Examiner*—David Y. Eng
(74) *Attorney, Agent, or Firm*—Kirk D. Houser; Eckert Seamans Cherin & Mellott, LLC (57) ABSTRACT

A communication system includes a first communication device, a second communication device, and a communication channel, such as modems and a telephone line, between the devices. The first device includes: a first memory for storing first information, a first processor, and a first communication controller for transmitting a message. The first processor periodically determines a plurality of values, and a count of any of those values which changed after a previous determination of those values. The first processor also alternatively selects for transmission in the message, as a function of the count, either (i) all of the values, or (ii) the values which changed. The second device includes: a second memory for storing second information, a second communication controller for receiving the message, and a second processor. The second processor alternatively updates the stored second information with either (i) all of the values, or (ii) the values which changed of the message. The second processor also processes the stored second information.

22 Claims, 8 Drawing Sheets

COMMUNICATION SYSTEM

BACKGROUND OF THE INVENTION

1. Field of the Invention

The invention relates to communications and, more particularly, to a communication system between a pair of communication devices. The invention also relates to a communication system between a pair of programmable logic controllers.

2. Background Information

It is known to transfer a collection of information from a master device to a slave device, and/or to transfer another collection of information from the slave device to the master device.

Examples of such master and slave devices include programmable logic controllers (PLCs) which are well-known in the art. PLCs are utilized to solve ladder logic which is represented by a power rail, a plurality of inputs or functional devices or contacts, a plurality of outputs or results devices or coils, and a neutral rail. The ladder logic includes a plurality of individual ladder diagrams, segments or rungs.

In addition to contacts and coils, data values in PLCs are often organized in a series of holding registers (e.g., 16-bit words). In tun, various "special functions" are employed in order to provide mathematical or logical manipulation of the holding registers, or to send and/or receive some of the holding registers via serial communication (e.g., RS-232, communication network). For example, a block move special function may be employed to send or receive a collection of holding registers to or from another device (e.g., another PLC, another controller, an input device, an output device).

A master PLC, for example, may transfer a collection of data, such as controls, to a slave PLC, and the slave PLC may transfer a collection of data, such as indications or display information, to the master PLC. One disadvantage of these forms of communication is that, typically, most of the information being sent is "static" rather than "dynamic". In other words, between successive communications, only the dynamic data has changed. Thus, a significant portion of the bandwidth of the communication link between the master and slave devices may typically be wasted.

It is also known to transfer data between a first device and one or more second devices over a communication network within a specific time period. See, for example, U.S. Pat. Nos. 5,142,623; and 5,864,680.

In broadcast multi-cast communication networks, the messages are not addressed to any specific station. Each station receives all of the data transmitted and traditionally takes what it needs. This also requires processing of the message by the central processing unit of the receiving station. Typically, to reduce the burden on the system, data is only broadcast by exception (i.e., only when the value of a piece of data changes is a corresponding message sent). Thus, for instance, in a distributed process control system, where various functions are being performed by a number of stations on a network, data is only broadcast when the value of a variable changes. Other deterministic systems, such as automatic teller machines linked to a central unit by a network, also only send data when there is a particular transaction to process. However, such systems can become overburdened if there is a large disturbance in the process being controlled, or if a large number of transactions occur simultaneously. See, for example, U.S. Pat. No. 5,864,680.

In known transfers of collections of data between corresponding PLCs, it is believed that all of such data is transferred between the PLCs regardless whether any or all of that data has changed. For example, a large number of holding registers may be periodically sent even though only one holding register or bit, if any, has changed since the previous communication.

Although the prior art shows various types of communication systems, there is room for improvement.

SUMMARY OF THE INVENTION

In accordance with the invention, values are communicated between first and second communication devices. One of the devices determines the values along with a count of any of the values which changed after a previous determination of the values. That device alternatively selects for communication in a message, as a function of the count, either all of the determined values, or those values which changed since the previous determination of the values.

As one aspect of the invention, a communication system comprises a first communication device, a second communication device, and a communication channel between first and second communication means. The first communication device includes: first memory means for storing first information; first processor means (a) for repetitively determining a plurality of values as at least some of the first information, (b) for determining a count of any of the values which changed after a previous determination of the values, and (c) for alternatively selecting for communication in a message, as a function of the count, either (i) all of the values, or (ii) the any of the values; and the first communication means for communicating the message. The second communication device includes: second memory means for storing second information; the second communication means for communicating the message; and second processor means (a) for alternatively updating the stored second information with either (i) all of the values, or (ii) the any of the values of the message, and (b) for processing at least some of the stored second information of the second memory means.

As a refinement, the values are a plurality of first values and the message is a first message. The second processor means includes: means for determining a plurality of second values; means for determining whether any of the second values has changed; means for alternatively selecting for communication with a second message either (i) all of the second values, or (ii) such any of the second values; and means for processing at least some of the stored second information. The first processor means includes: means for alternatively updating the stored first information with either (i) all of the second values, or (ii) such any of the second values; and means for processing at least some of the stored first information.

Preferably, the second processor means further includes means for determining whether greater than a predetermined count of the second values has changed, and means for informing the first processor means that greater than the predetermined count of the second values has changed. As a further refinement, the first processor means includes means for requesting all of the second values after being informing by the second processor means that greater than the predetermined count of the second values has changed, and the second processor means further includes means for sending the first processor means all of the second values in a subsequent second message.

As another aspect of the invention, a communication system comprises a first programmable logic controller, a second programmable logic controller, and means for communicating information between first and second communication means. The first programmable logic controller includes: first memory means for storing first information; first processor means (a) for repetitively determining a plurality of values as at least some of the first information, (b) for determining which ones of the values changed after a previous determination of the values, and (c) for selecting for communication in a message the ones of the values which changed; and the first communication means for communicating the message. The second programmable logic controller includes: second memory means for storing second information; the second communication means for communicating the message; and second processor means (a) for updating the stored second information with the ones of the values which changed, and (b) for processing at least some of the stored second information of the second memory means.

Preferably, the first processor means includes means for alternatively selecting for communication with the message either (i) all of the values, or (ii) the ones of the values which changed, and the second processor means includes means for alternatively updating the stored second information with either (i) all of the values, or (ii) the ones of the values which changed of the message.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
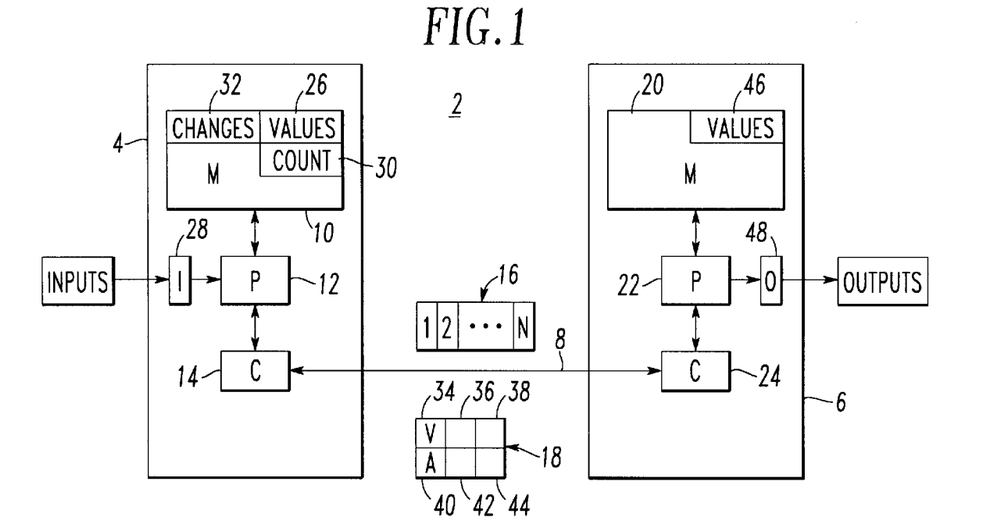
FIG. 1 is a block diagram of a communication system employing communication devices in accordance with an embodiment of the present invention.

Referring to FIG. 1, a communication system 2 is illustrated. The system 2 includes a first communication device 4, a second communication device 6, and a communication channel 8 therebetween. The first communication device 4 includes a memory (M) 10 for storing first information, a processor (P) 12, and a communication interface (C) 14 for transmitting messages 16,18. Similarly, the second communication device 6 includes a memory 20 for storing second information, a processor 22, and a communication interface 24 for receiving the messages 16,18 over the communication channel 8, which is between the communication interfaces 14,24.

The following describes communication of information in the messages 16,18 from the first communication device 4 to the second communication device 6, although the invention is applicable to such communication in either the opposite direction (i.e., from the second device 6 to the first device 4) or in both directions (i.e., between the devices 4,6). In this example, the first communication interface 14 sends the messages 16,18 to the second communication interface 24 over the communication channel 8. The first processor 12 repetitively, and preferably periodically, determines a plurality of values 26 as at least some of the first information in the memory 10. For example, those values 26 may be input from input interface (I) 28 or may be calculated by the processor 12. The processor 12 also determines a count 30 of any of the values 26, which changed after a previous determination of those values. For example, a table of "old" values from the previous determination may be compared with another table of "new" values from the current determination, in order to determine the count 30.

In the exemplary embodiment, the processor 12 alternatively selects for communication in the messages 16 or 18, as a function of the count 30, either (1) all of the values 26 in the message 16, or (2) a subset 32 of the values 26 which changed in the current determination as compared with the previous determination of those values 26. Preferably, the processor 12 employs a predetermined count (e.g., without limitation, 10) of such changes. If the count of changes exceeds that predetermined count, then all (e.g., as defined by N=100 words) of the values 26 are sent in the message 16. Otherwise, if the count (e.g., 3) of changes is less than or equal to the predetermined count, then only those values (V) 34,36,38 are sent in the message 18, along with identifiers (A) (e.g., addresses or indices) 40,42,44, respectively, for those values. The selection of the predetermined count depends, for example, on the characteristics of the system 2, the bandwidth of the communication channel 8, the type of processors 12,22, and the efficiency of the protocol employed for the messages 16,18.

The second processor 22 alternatively updates the stored second information 46 in the memory 20 with either (1) all of the values from the message 16, or (2) the subset of values 34,36,38 of the message 18. In turn, the second processor 22 processes at least some of the stored second information 46. For example, the values included in the information 46 may be output to output interface (O) 48 for purpose of display and/or control.

Figure 2:
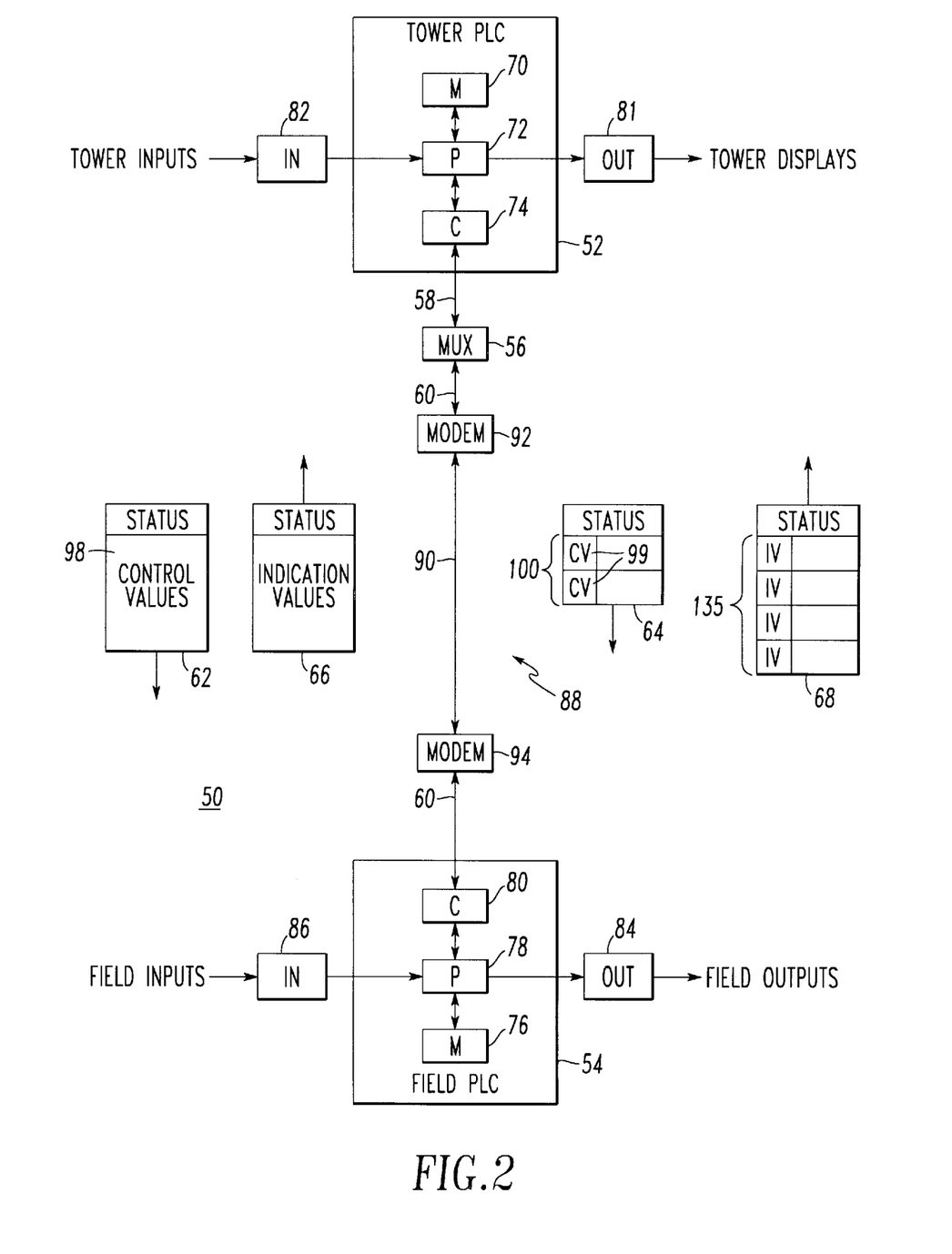
FIG. 2 is a block diagram of another communication system employing programmable logic controllers (PLCs) in accordance with another embodiment of the invention.

FIG. 2 shows another communication system 50 including an exemplary tower or master programmable logic controller (PLC) 52 and a field or slave PLC 54. The PLCs 52,54 are specific examples of the communications devices 4,6 of FIG. 1. In the exemplary embodiment, the PLCs 52,54 are Quantum PLCs marketed by Modicon, and the system 50 is a railway control and data acquisition system, although the invention is applicable to a wide range of communication systems and other communication devices (e.g., without limitation, other PLCs, other logic controllers). A Network Option Module (not shown), which resides in the Quantum PLC backplane, and an external bridge MUX 56, such as BM85 marketed by Modicon, are employed to convert an exemplary Modicon MODBUS PLUS message format 58 into an exemplary Modicon MODBUS message format 60. The exemplary PLC 52 employs a special function block, MSTR, to provide the MODBUS PLUS message format 58.

The master PLC 52 employs a Data Master Path for data reads and writes with respect to the slave PLC 54. The master PLC 52 employs this path to originate a data transfer, such as messages 62 or 64 to the slave PLC 54. The slave PLC 54, in turn, employs a Data Slave Path for data reads and writes with respect to the master PLC 52. Hence, the slave PLC 54 employs this path to respond to a data transfer request with responsive messages, such as messages 66 or 68 to the master PLC 52. For example, the specific parameters of interest for the exemplary MSTR block include: (1) Block Type (1=write, 2=read); (2) Data Matrix Length (between 1 and 100 words); (3) Foreign Device Data Matrix Location (defined by the application); and (4) Routing Path (from Terminal Device to Foreign Device). Each MSTR block may be scheduled to run by an enable input to that function block.

Although only one slave PLC 54 is shown, the invention is applicable to communication systems, which employ plural slave PLCs, some of which may be redundant. For example, for a pair of redundant slave PLCs, one is deemed to be online, and the other is deemed to be standby. Only the online PLC is employed to drive the outputs or controls associated with the redundant pair. In turn, a switch between the online and standby states may be initiated under appropriate circumstances (e.g., communication line failure, processor failure). Similarly, redundant inputs may be employed, with one PLC obtaining the status of its own field inputs and, also, reading a status report of redundant field inputs from the other redundant PLC. In turn, the two input matrices are compared on a timed basis for discrepancies.

The master PLC 52 includes a memory (M) 70, a processor (P) 72, and a communication interface (C) 74, and the slave PLC 54 includes a memory (M) 76, a processor (P) 78, and a communication interface (C) 80 for communicating the messages 62,66,64,68 between the PLCs 52,54. The function of the exemplary master PLC 52 is to output information through outputs (OUT) 81 for purpose of displaying tower "indications", and to input other tower information through inputs (IN) 82 for use in calculations and/or transfer of input or calculated values to the slave PLC 54 via the messages 62,64. The function of the exemplary slave PLC 54 is to output information through outputs (OUT) 84 for purpose of providing field "controls", and to input other field information through inputs (IN) 86 for calculations, control and/or transfer of input or calculated values to the master PLC 52 via the messages 66,68. Preferably, the values in the messages 62,64 to the slave PLC 54 may be employed for at least some of the field outputs, and the values in the messages 66,68 to the master PLC 52 may be employed for at least some of the tower displays.

A communication channel 88, in the form of an exemplary communication line, such as telephone line 90, and modems 92,94, is employed to communicate information in the messages 62,64,66,68 between the MUX 56 of the master PLC 52 and the communication interface 80 of the slave PLC 54. Thus, the MUX 56 sends the messages 62,64 to the communication interface 80, which receives those messages. The MUX 56 communicates with the modem 92 and employs the telephone line 90 for communicating that information. Similarly, the communication interface 80 sends the messages 66,68 to the other MUX 56, which receives those messages. The communication interface 80 communicates with the modem 94 and employs the telephone line 90, which is electrically connected between the modems 92,94, for communicating that information.

As a further example, the memory 70 of the master PLC 52 stores control information, the values 98,99 of which are communicated to the slave PLC 54 in the respective messages 62,64. The processor 72 periodically, as part of its ladder scan, determines control values as at least some of that control information, and determines which ones of the control values changed after a previous determination of those values. As an important aspect of the present invention, the processor 72 selects for communication in the message 64 the subset of values 100 of the control values 98 which changed from the previous ladder scan. In turn, the processor 78 of the slave PLC 54, after receiving the message 64, updates stored information in the memory 76 with those control values which changed. In turn, the processor 78 processes at least some of that stored information and outputs the same through the outputs 84.

In the exemplary embodiment, an "update by exception" of the values being communicated between the PLCs 52,54 is normally employed, with a "full system update" of all communicated values being requested by the slave PLC 54 whenever greater than a predetermined count of indications (e.g., values being sent to the master PLC 52) has changed, since, in that embodiment, indications are much more likely to change than controls (e.g., values being sent to the slave PLC 54). The invention, however, is applicable to other communication systems in which update by exception is triggered from the master to the slave, or which is triggered by both the slave and the master. For example, in the exemplary embodiment, the master PLC 52 normally employs update by exception, unless otherwise requested by the slave PLC 54. However, to ensure that both controls and indications are accurately mapped between both the master PLC 52 and the slave PLC 54, a full system update is periodically employed by the master PLC 52. The "update by exception" and "full system update" techniques are discussed below in greater detail in connection with FIGS. 3A–3B, 4, 5, 6A–6B, and 7A–7B.

Figure 3A:
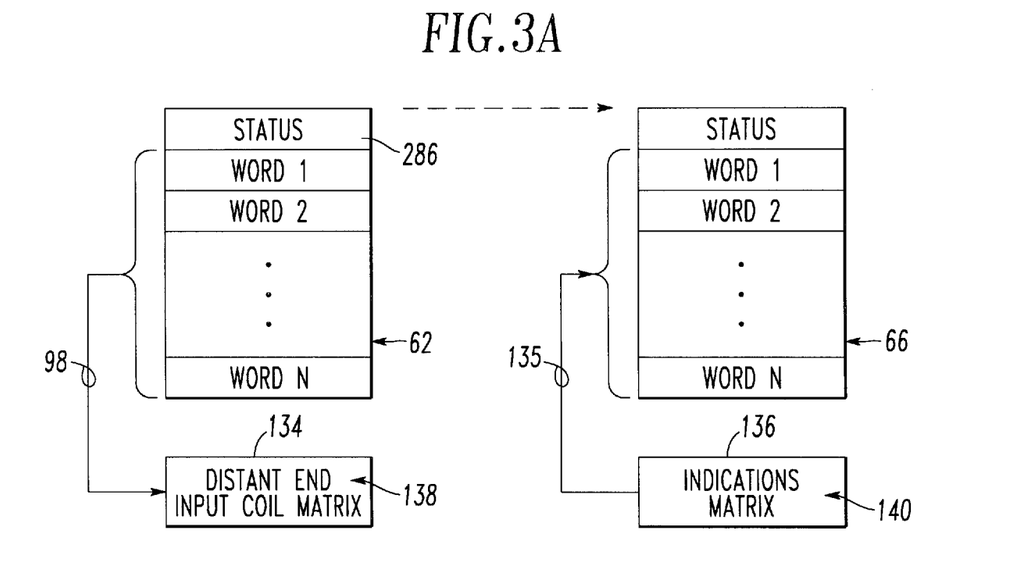
FIGS. 3A and 3B are diagrams of message formats for communication in accordance with the invention.
Figure 3B:
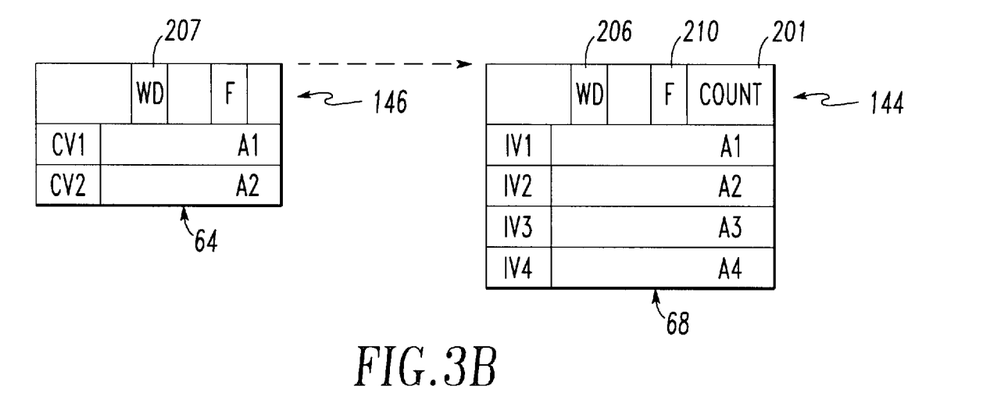
Figure 4:
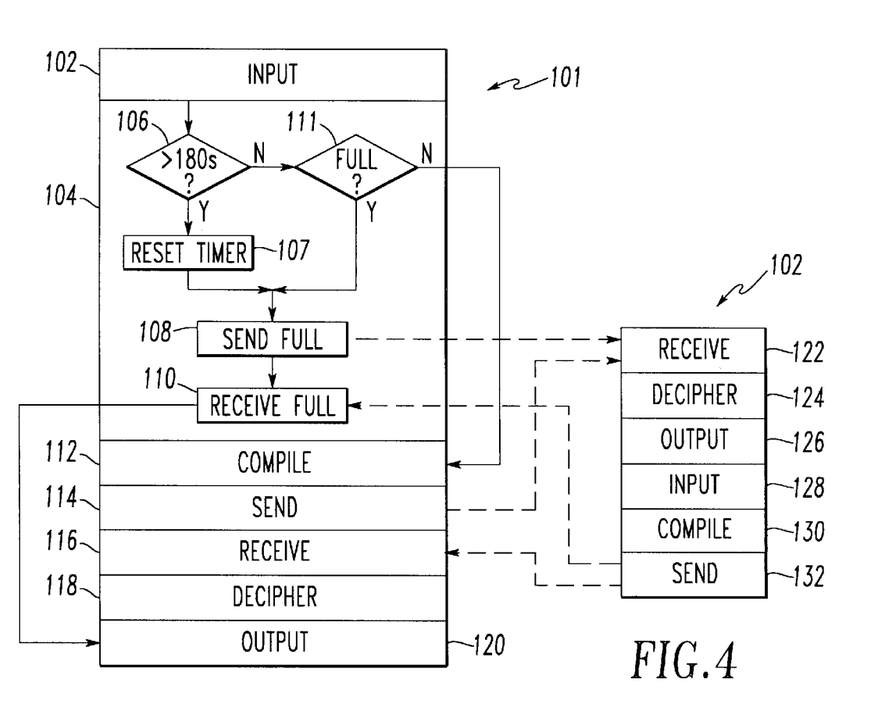
FIG. 4 is a block diagram of the communication algorithms employed by the PLCs of FIG. 2.

FIGS. 3A–3B show the format of the messages 62,64,66, 68, and FIG. 4 shows the communication algorithms 101, 102 employed by the PLCs 52,54 of FIG. 2 to send and receive those messages. Referring to FIGS. 2 and 4, at 102, the master PLC 52 determines new control values 98 for output to the slave PLC 54. Next, at 104, it is determined whether an exemplary 180 s timer has expired, or whether a full system update has been requested by the slave PLC 54. If the timer has expired at 106, then, at 107, the timer is reset and, at 108, the full system update message 62 (as best shown in FIG. 3A) is prepared and sent to the slave PLC 54. In response, the slave PLC 54 prepares and sends, at 132, the responsive full system update message 66 (as best shown in FIG. 3A) to the master PLC 52, which receives the message 66 at 110. In turn, the indication values of the responsive message 66 are output at 120.

Otherwise, if the timer did not expire at 106, then it is determined whether the slave PLC 54 requested a full system update at 111. If so, then step 108 is repeated. Otherwise, the update by exception message 64 including control values CV1,CV2 is compiled, at 112, and sent to the slave PLC 54, at 114. In response, the slave PLC 54 prepares and sends, at 131, the responsive update by exception message 68 (as best shown in FIG. 3B) to the master PLC 52, which receives that message at 116. In turn, the message 68 is deciphered at 118 and the indication values IV1,IV2, IV3,IV4 of that message are output at 120.

The corresponding communication algorithm 102 of the slave PLC 54, which responds to the master PLC 52, includes the steps of receiving, at 122, and deciphering, at 124, one of the messages 62,64 from the master PLC 52. In turn, the values from one of those messages are output at 126. A suitable input scan is performed at 128. Then, one of the responsive messages 66,68 is compiled at 130, and is sent to the master PLC 52 at 132. For the responsive update by exception message 68, the COMPILE algorithm 130 of the slave PLC 54: (1) examines the memory 76 for any changed data relative to the last transmission to the master PLC 52; (2) identifies the changed data relative to the last transmission; and (3) loads the changed data relative to the last transmission.

Figure 5:
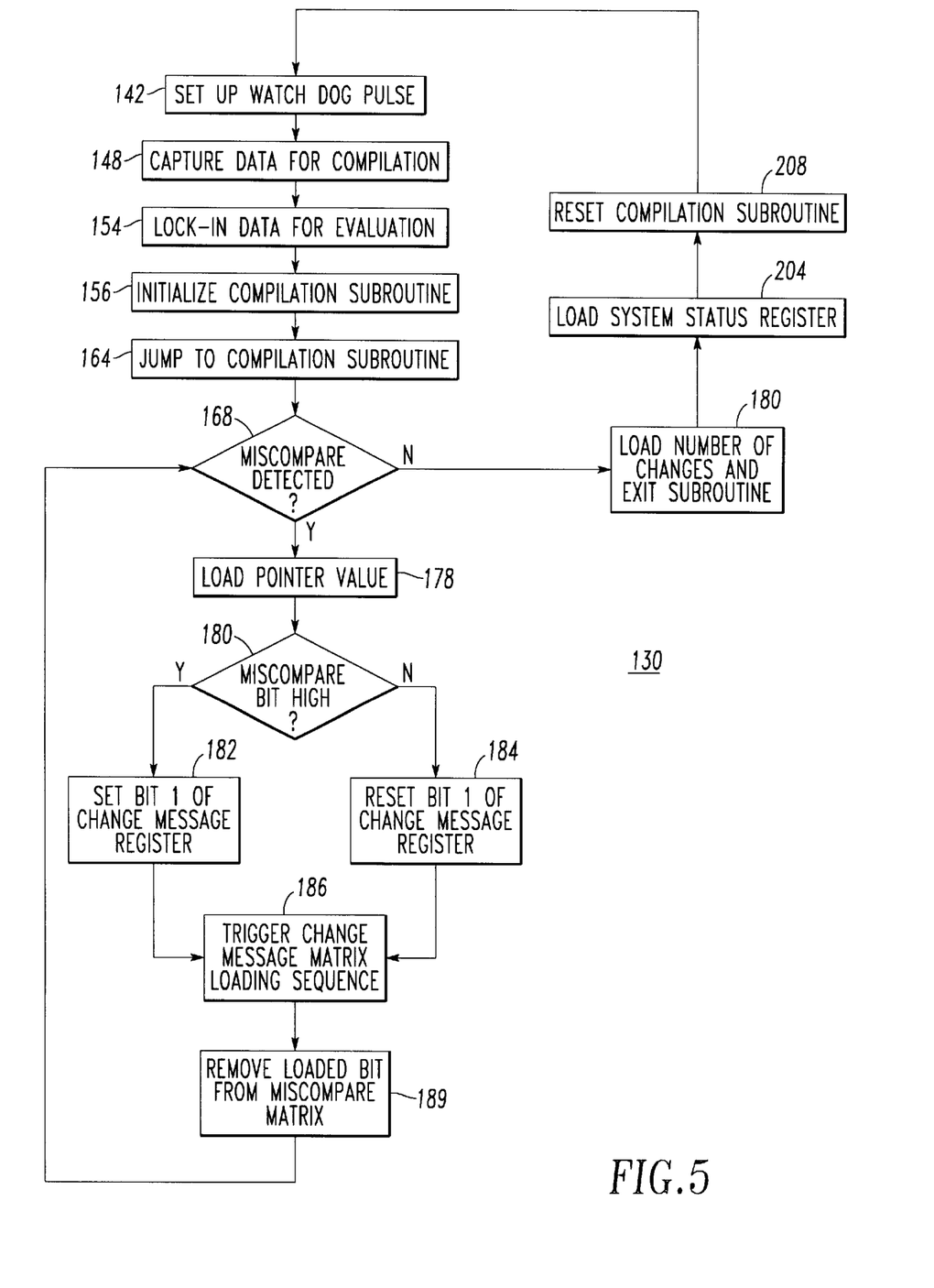
FIG. 5 is a flowchart of a compile change message algorithm as employed by the slave PLC of FIG. 2.
Figure 6A:
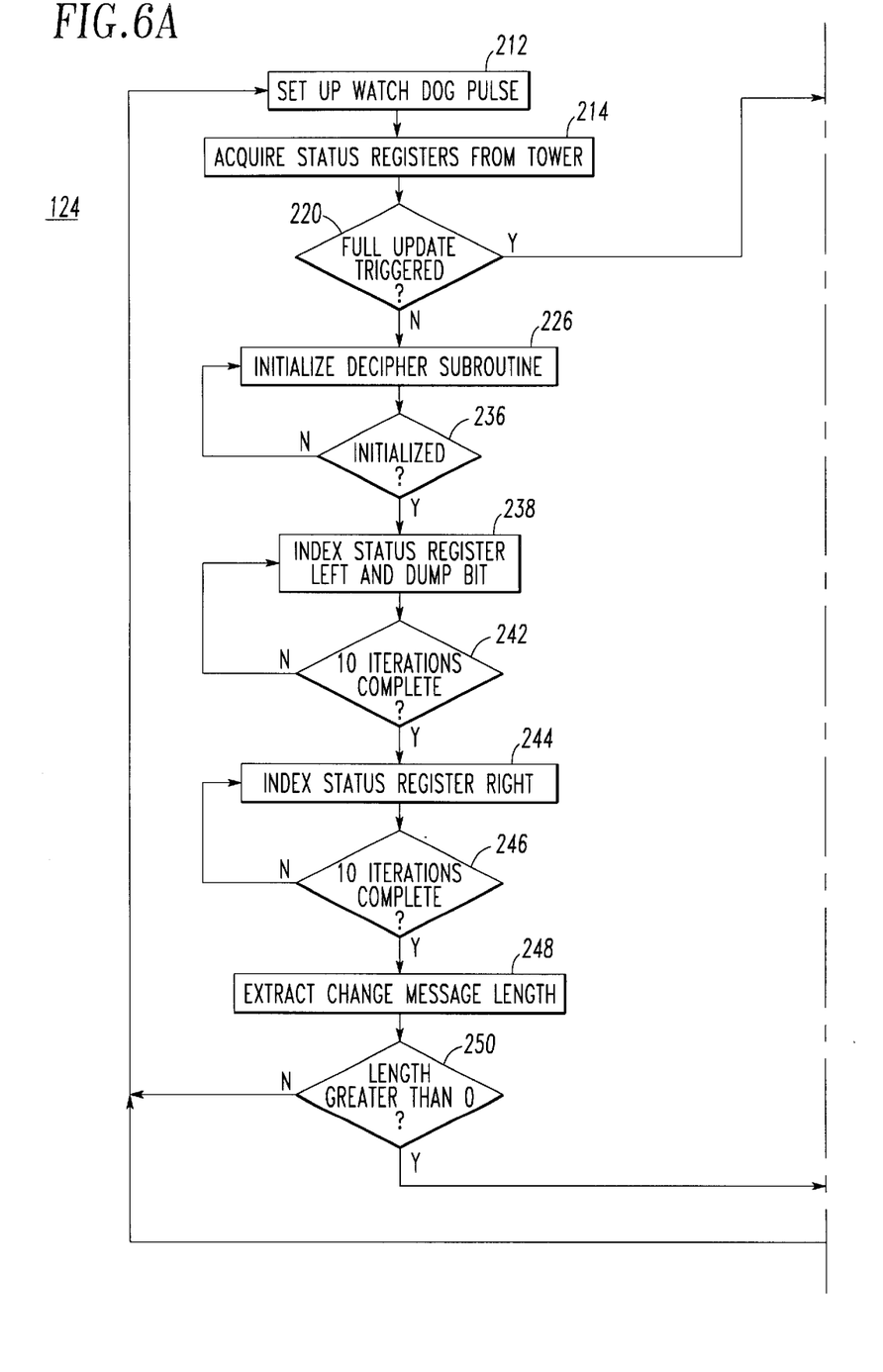
FIGS. 6A–6B are a flowchart of a decipher change message algorithm as employed by the slave PLC of FIG. 2.
Figure 6B:
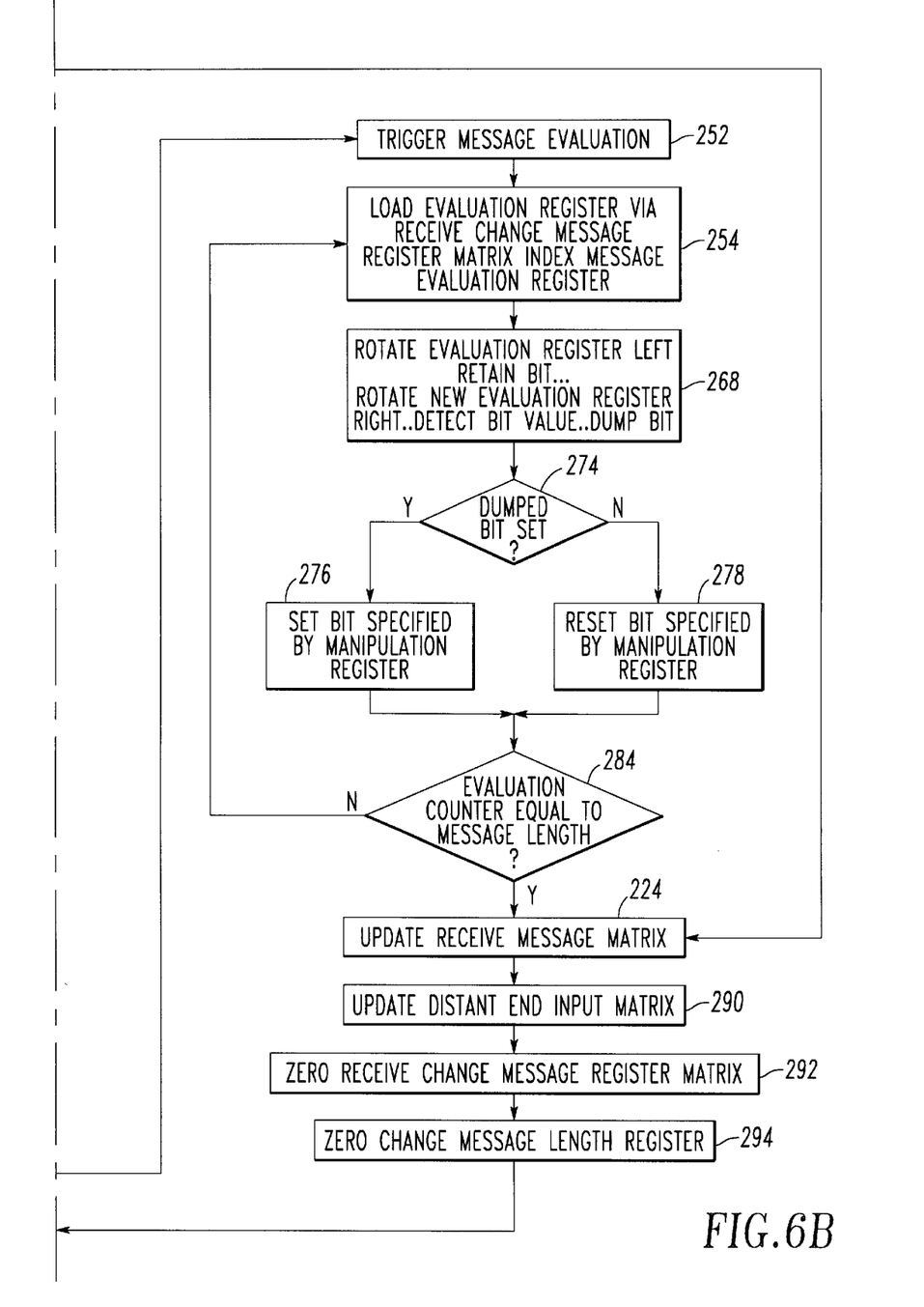

In summary, there are two ways by which the slave PLC 54 translates control values in the messages 62,64 from the master PLC 52 to outputs 84 to the field controls, and translates the corresponding inputs 86 from the field to indication values in responsive messages 66,68 to the master PLC 52 for the outputs 81 to tower displays: (1) update by exception; and (2) full system update. The primary method is to update by exception, which employs two distinct algorithms. The two algorithms include COMPILE 130 (as best shown in FIG. 5) and DECIPHER 124 (as best shown in FIGS. 6A–6B). The benefit of updating by exception is that the communication channel 88 does not include data that has not changed and, thus, the duty cycle of the PLCs 52,54 is not wasted in supporting unnecessary communication. In turn, this allows for shorter message lengths (i.e., in messages 64,68 as compared to messages 62,66) and, thus, quicker data throughput. As a result, there is a much better indication response at the tower to a control action in the field.

It will be appreciated that the master PLC 52 employs similar corresponding COMPILE 112 and DECIPHER 118 algorithms for communication with the slave PLC 54.

The secondary method is the full system update. The full system update method directly writes, from the master PLC 52, all communicated control values 98 to the slave PLC Distant End Input Coil Matrix 134 (shown in FIG. 3A), which is used to drive control outputs 84. The full system update method also directly reads, at the master PLC 52, all communicated indication values 135 from the slave PLC Indications Matrix 136 (shown in FIG. 3A). In the exemplary embodiment, both of the matrices 134,136 include N (e.g., without limitation, 100) 16-bit words of data (i.e., 1600 bit values), although the invention is applicable to a wide range of matrix sizes. The benefit of the full system update is the knowledge that the control values 138, which are output by the master PLC 52 to the slave PLC 54, and the indication values 140, which are input from the slave PLC 54 to the master PLC 52, are completely refreshed.

In the exemplary embodiment, the full system update is initiated by either: (1) an excessive number of changes as detected by the slave PLC 54, or (2) an elapsed timer trigger 106 of the master PLC 52. In the exemplary embodiment, the excessive number of changes is set to ten, and the elapsed timer trigger is set to 180 s, although the present invention is applicable to a wide range of such values. Preferably, those values are dependent upon the particular communication application and are tuned during application testing.

FIG. 5 is a flowchart of the COMPILE change message algorithm 130 as employed by the slave PLC 54 of FIG. 2. Although an exemplary ladder logic embodiment is discussed in connection with the algorithms 124,130, the invention is applicable to non-PLC based algorithms. The following descriptions pertain to one scan of the exemplary logic of FIGS. 5 and 6A–6B.

The COMPILE algorithm 130 is initiated in response to the message 64 from the master PLC 52 of FIG. 2. At 142, the status of the communication line is monitored. For example, the slave PLC 54 detects a communication line failure by employing a suitable watchdog pulse algorithm, which continuously cycles a specific bit in the slave PLC 54. In turn, that bit is employed to cycle the watchdog bit (WD) 206 of the Transmit Status Word 144 (FIG. 3B) that is transmitted to the master PLC 52 in the message 68. Likewise, the slave PLC 52 monitors the watchdog bit (WD) 207 of the Receive Status Word 146 (FIG. 3B) that it receives from the master PLC 52 in the message 64. In turn, the changed state of that received watchdog bit (i.e., set to reset, reset to set) is employed to start a timer (not shown) for checking communications. When the received watchdog bit is static for a predetermined period of time (e.g., greater than about two seconds in the exemplary embodiment), then the timer will elapse and trigger a communication line failure. The watchdog is employed to ensure a consistent and periodic update of the controls and indications between the PLCs 52,54. A wide range of values may be employed for the predetermined watchdog timer period.

Next, at 148, the acquisition of indications (e.g., from inputs 86 of FIG. 2) is triggered. This occurs at every transition of the received watchdog bit (WD) 207 in the Receive Status Word 146 (FIG. 3B). For example, one ladder coil may be used to trigger data acquisition in Indications-A 150 (FIG. 7A) with the watchdog bit being set, and another coil may be used to trigger data acquisition in Indications-B 152 (FIG. 7A) with the watchdog bit being reset. Then, at 154, the acquired indications from step 148 are locked-in for purpose of evaluation. Preferably, the data is captured during one ladder scan at step 148 and is, then, locked-in by setting one of two mutually exclusive coils during the subsequent scan at 154. For example, one ladder coil may be used to trigger data lock-in for Indications-A 150 with the watchdog bit being set, and another coil may be used to trigger data lock-in for Indications-B 152 with the watchdog bit being reset.

Figure 7A:
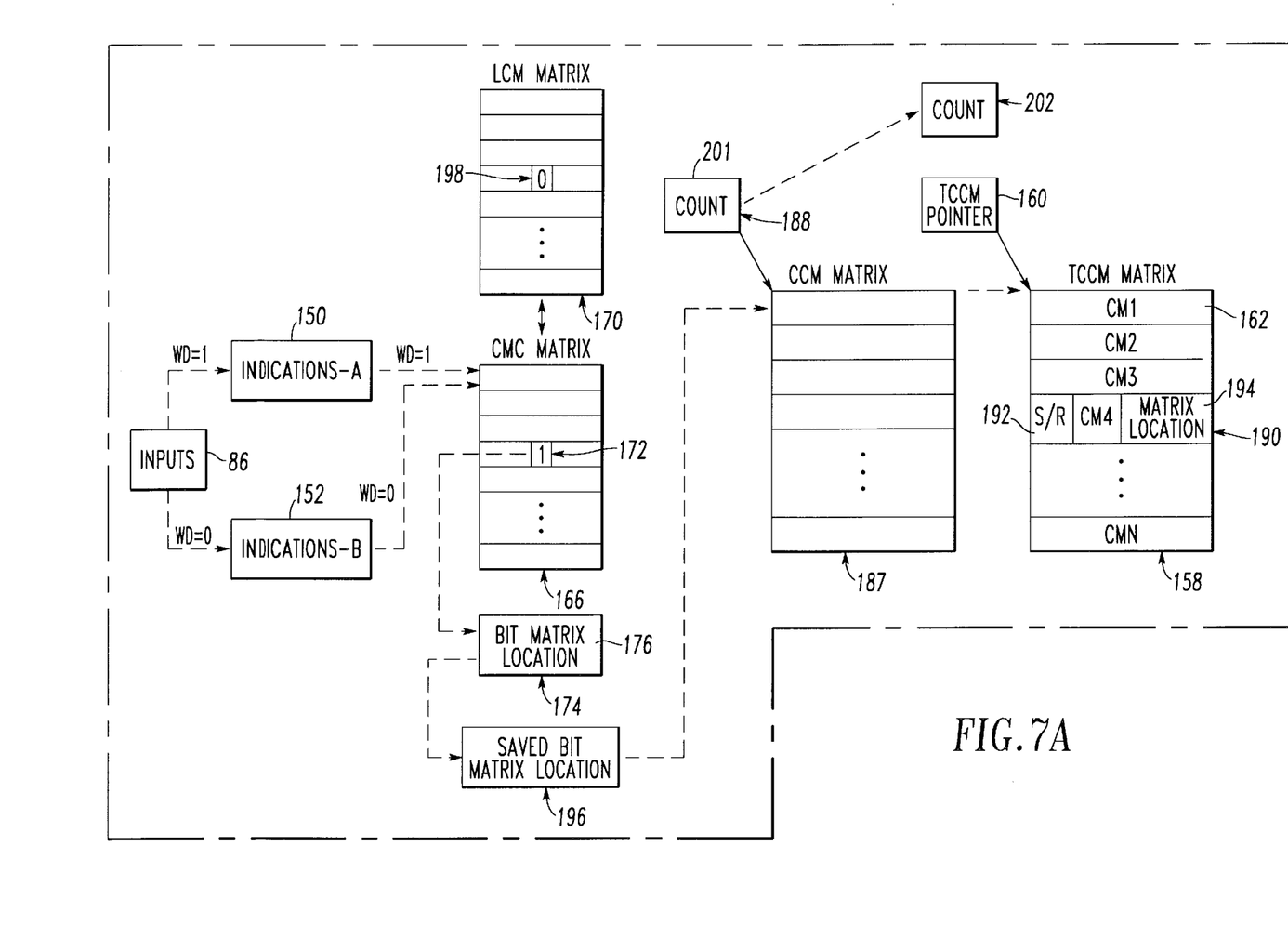
FIGS. 7A and 7B are diagrams showing the data structures employed by the algorithms of FIGS. 5 and 6A–6B, respectively.

Next, at 156, a Transmit Compiled Change Message (TCCM) Matrix 158 (FIG. 7A) is initialized. For example, transition of either of the coils of step 154 loads a value of zero to a suitable function block and initializes TCCM Pointer 160, which points to the TCCM Matrix 158. This ensures that the subsequent compilation logic will map its first computed Change Message (CM1) to the first matrix location 162 of the TCCM Matrix 158. Then, at 164, the acquired and locked-in indications (i.e., the newest data) from step 154 are captured in a Change Message Compiler (CMC) Matrix 166 (FIG. 7A). For example, the capture is initiated, upon transition of either of the coils of step 154, from the corresponding one of the Indications-A 150 or Indications-B 152.

At this point, a full system update from the master PLC 52 is not being executed. At 168, it is determined whether or not there is a mismatch between the "newest data" in the CMC Matrix 166 and prior data (i.e., the last transmitted data) in a Last Change Message (LCM) Matrix 170 (FIG. 7A). For example, a comparator (CMPR) function block compares the "newest data" of CMC Matrix 166 with the "last transmitted data" in LCM Matrix 170 bit by bit in one ladder scan. The CMPR function block stops the comparison check and sets an internal coil upon detection of a first miscompare bit (e.g., bit 172 of FIG. 7A, which is a one, while bit 198 of LCM Matrix 170 is a zero). The status of another internal coil is employed to indicated the state of the "newest data" CMC Matrix 166, with a register 174 being employed to hold the Bit Matrix Location 176 (i.e., pointer value) of the miscompare bit. If there was at least one change to consider, then a miscomparison is detected and execution resumes at 178. Otherwise, execution jumps to 180 as discussed below.

Steps 178,180,182,184,186,189 are employed to build individual registers (e.g., CM1, CM2) of the TCCM Matrix 158. The structured format of these registers is shown with register 190 (CM4 of FIG. 7A) in which the left-most (with respect to FIG. 7A) bit (e.g., bit 1) is the set/reset (S/R) state 192 of the changed indication, and the right-most eleven bits (e.g., bits 6–16) arc the matrix location 194 of the changed bit. Thus, the first bit (which is the most significant bit in this example) is employed to define the set or reset state of the bit which changed from the "last transmitted" to the "newest" data. Also, bit 6 through and including bit 16 (i.e., in this example, 11 bits and, thus, 2048 possible values) are employed to define one of the 1600 bits of the exemplary 100-word CMC Matrix 166.

At 178, the pointer value Bit Matrix Location 176 of the miscompare bit in register 174 is moved into register 196 via a block move (BLKM) function block for manipulation purposes. Then, at 180, the second internal coil of step 168, which indicates the state of the "newest data" in the CMC Matrix 166, is checked to determine the "new" value. At 182, if the "newest data" is a logical one (i.e., true or high), then a modify bit (MBIT) function block sets the first bit of the Saved Bit Matrix Location in register 196 (FIG. 7A). Otherwise, if the "newest data" is a logical zero (i.e., false or low), then at 184, another modify bit (MBIT) function block resets the first bit of the register 196. Thus, upon completion of steps 180,182,184, the bit location and bit value of the miscompare bit have been identified and formatted in register 196 consistent with the desired format of the exemplary registers (e.g., CM1) of the TCCM Matrix 158.

Next, at 186, the register data that is temporarily stored by the register 196, is loaded into the first register of a Compiled Change Message (CCM) Matrix 187 (FIG. 7A). For example, a register to table (R>T) function block is employed. In this example, a register 188 (FIG. 7A) holds the count 201 of compiled change messages (e.g., one at this stage of the example) and, thus, points to the initial register location of the CCM Matrix 187. Also, an internal coil is set upon the completion of this step. Then, at 189, a modify bit (MBIT) function block is employed to force the value (e.g., 0) of the original miscompare bit 198 (FIG. 7A) in the "last transmitted" data in the LCM Matrix 170 to the new value (e.g., 1) of the corresponding bit 172 in the CCM Matrix 166. For example, the internal coils set at steps 168 and 186 determine the path taken to two modify bit (MBIT) function blocks, with one block setting the appropriate bit of the appropriate register of LCM Matrix 170, and the other block resetting that bit. The specific bit to be modified is determined by the value contained within the register 174, which holds the Bit Matrix Location 176 of the original miscompare bit. Thus, the first MBIT function block removes the original miscompare bit (i.e., 0) from the LCM Matrix 170 by setting the bit 198 referenced by the register 174, while the second MBIT function block removes an original miscompare bit (i.e., 1) from that matrix by resetting (not shown) that bit. In this maimer, when the compilation algorithm continues at step 168, the compare (CMPR) function block may step to the next, if any, miscompare bit.

Otherwise, if there are no further changes to consider, no miscomparison is detected at 168, the internal coil thereof is not set, and execution resumes at 180. Step 180 employs a block move (BLKM) function block to load the count 201 of compiled change messages from register 188 into bits 11–16 (e.g., 6 bits or up to 63 changed values) of the Transmit Status Word 144 (FIG. 3B) associated with the TCCM Matrix 158 (FIG. 7A). Also, the CCM Matrix 187 is copied to the TCCM Matrix 158, and the count 201 of compiled change messages from register 188 is also copied to another register 202.

Next, at 204, bits 1–5 and 7–9 of the Transmit Status Word 144 (FIG. 3B) are set to application specific values. For example, the triggering mechanisms of these bits may be real world field inputs that are input, at 86, by the slave PLC 54, with an energized input setting the bit and a de-energized input resetting the bit. Bit 6 is reserved for the watchdog bit (WD) 206, as mentioned above. Bit 10, the Full System Update Trigger Bit 210 of the Transmit Status Word 144 is set or reset to the appropriate state. The Trigger Bit 210 is internally evaluated by comparing the count of compiled change messages from register 202 to a predetermined value. For example, a specific constant (e.g., 10) is defined by an input to a TEST function block. When the count of compiled change messages exceeds the constant, then a modify bit (MBIT) function block is employed to set bit 10 of the Transmit Status Word 144. Otherwise, when the count of compiled change messages is less than or equal to that constant, then another modify bit (MBIT) function block is employed to reset bit 10 of Transmit Status Word 144. In this manner, the master PLC 52, as part of its receive 116 and decipher 118 logic of FIG. 4, may be triggered, at 111, to employ a full system update algorithm by monitoring bit 10 of the Transmit Status Word 144, thereby permitting the slave PLC 54 to map all of its values to the master PLC 52 in the subsequent responsive message 68. Thus, the slave PLC 54 responds to the communication request of the master PLC 52 and sends the TCCM Matrix 158 to the master PLC 52.

Finally, at 208, in response to the internal coils of step 164, the TCCM Matrix 158 is zeroed by a register to table (R>T) function block based upon the count of compiled change messages of register 202, before execution, in a new scan, resumes at 142, and the logic is directed to compile new changes.

FIGS. 6A–6B show the DECIPHER 124 change message algorithm as employed by the slave PLC 54 of FIG. 2 to: (1) load the changed data relative to the last reception from the master PLC 52; (2) identify the changed data relative to the last reception; and (3) update itself with the changed data relative to the last reception.

The DECIPHER algorithm 124 is initiated in response to the messages 62,64 from the master PLC 52. At 212, the status of the communication line is monitored. Preferably, the same watchdog pulse from the master PLC 52 initiates both the COMPILE 130 and DECIPHER 124 subroutines. Next, at 214, bits 1, 3 and 6 of a Receive Status Register (RSR) 216 (FIG. 7B) are updated based upon the corresponding bits of the Receive Status Word 146 (FIG. 3B) as received from the master PLC 52.

Figure 7B:
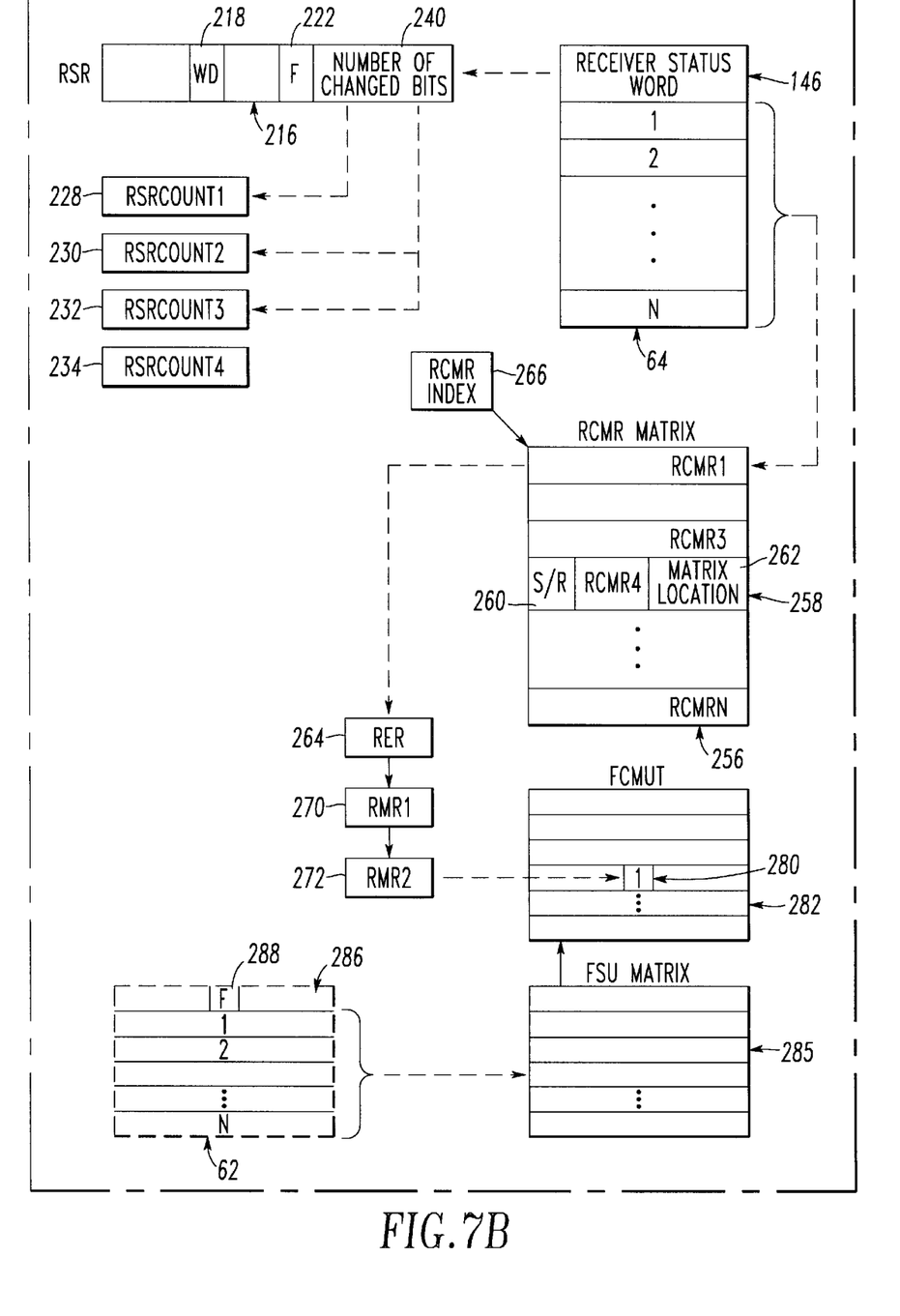

Bits 1 and 3 are employed to select one of a pair of redundant PLCs. In the exemplary embodiment, only the single slave PLC 54 is employed (e.g., only bit 1 is set). Bit 6 is the master watchdog (WD) bit 218. Then, at 220, it is determined whether to run the decipher portion of the algorithm 124. If a full system update is requested (e.g., as defined by a coil which is set by the full update (F) bit 222, which follows the watchdog bit (WD) 207 of the exemplary Receive Status Word 146), then execution resumes at 224.

Otherwise, after a change in state of WD bit 218 of the RSR 216, as obtained from bit 6 of the exemplary Receive Status Word 146, four accumulation counters used by the DECIPHER algorithm 124 are initialized at 226. For example, four block move (BLKM) function blocks move the value of zero from one register into four registers 228,230,232,234 (RSRCOUNT1–RSRCOUNT4 of FIG. 7B) which, respectively: (1) count the number of left bit rotations done to the RSR 216; (2) count the number of right bit rotations done to the RSR 216; (3) hold the count of changes to be evaluated as defined by the RSR 216; and (4) hold the count of changes as evaluated by the DECIPHER algorithm 124. These four registers are zeroed in response to the change in state of the WD 218 bit of the RSR 216, as obtained from bit 10 of the Receive Status Word 146.

Next, at 236, it is determined whether the counters 228,230,232,234 were initially reset to zero after step 226. For example, four test (TEST) function blocks are employed to test whether the counts held by those registers all equal zero. If not, then 226 is repeated. Otherwise, a subroutine is executed at 238. When the slave PLC 54 is executing this subroutine, the following conditions have been satisfied: (1) a full system update from the master PLC 52 is not being executed; and (2) all of the four accumulation counters were tested to equal zero. Also, at this point, the structured format of the RSR 216 includes: Bit 1 (Select A), Bit 3 (Select B), Bit 6 (Master Watch Dog 218), Bit 10 (Full Update 222) and Bits 11–16 (Number of Changed Bits 240). At steps 238 and 242, the Number of Changed Bits 240 at original bits 11–16 of the RSR 216 are saved while the other bits are discarded. Alternatively, a PLC which provides a logic mask special function may be employed.

For example, at 238, a bit rotate (BROT) function block is employed to rotate the bits of the RSR 216 left at the rate of one bit per scan. An internal coil is trigged upon execution of the bit rotation. The register RSRCOUNT1 228 is employed to count the number of left bit rotations done to the RSR 216. An addition function block (AD16) is employed to index the register RSRCOUNT1 228 at the rate of one time per scan of the subroutine. Then, at 242, that register is tested against an exemplary constant of ten, which is based upon the exemplary position of the Number of Changed Bits 240 at original bits 11–16 in the RSR 216, via a TEST function block. The TEST function block, in turn, either directs the logic to repeat 238, if less than ten bit rotations were completed, or to continue execution at 244 if ten bit rotations were completed and the number of changed bits was isolated in the RSR 216.

At 244 and 246, the Number of Changed Bits 240 is restored to its original position in the RSR 216. For example, at 244, another BROT function block is employed to rotate the bits of the RSR 216 right at the rate of one bit per scan of the subroutine. An internal coil is trigged upon execution of the bit rotation. The register RSRCOUNT2 230 is employed to count the number of right bit rotations done to the RSR 216. Another addition (AD16) function block is employed to index the register RSRCOUNT2 230 at the rate of one time per scan. Then, at 246, that register is tested against the exemplary constant of ten (as discussed above in connection with 242) via a TEST function block. The TEST function block, in turn, either directs the logic to repeat 244, if less than ten bit rotations were completed, or to continue execution at 248 if ten bit rotations were completed and the Number of Changed Bits 240 was restored in bits 10–16 of the RSR 216.

At 248, register RSRCOUNT3 232 is loaded with the message length (i.e., the Number of Changed Bits 240). For example, a block move (BLKM) function block moves the value of the RSR 216 into register RSRCOUNT3 232, which contains the count of changes to be evaluated. Next, at 250, it is determined whether that count is greater than zero. For example, a TEST function block tests the register RSRCOUNT3 232 against zero. If the count is greater than zero, then an internal coil is set and execution resumes at 252. Otherwise, there is no changed data and 212 is repeated.

Step 252 tests that internal coil and, when set, directs the logic to begin execution of a subroutine, at 254, to continue the algorithm 124. At this stage, when the slave PLC 54 is executing this subroutine, the following conditions have been satisfied: (1) a full system update from the master PLC 52 is not being executed; and (2) the DECIPHER algorithm 124 has generated a message length (N) which is greater than zero. Also, as derived from the portion of the message 64 after the Receive Status Word 146 of FIG. 3B, the structured format of a Receive Change Message Register (RCMR) Matrix 256 includes "N" Receive Change Message Registers (RCMRs). As shown with register 258 (RCMR4 of FIG. 7B), the left-most (with respect to FIG. 7B) bit (e.g., bit 1) is the set/reset (S/R) state 260 of the changed control, and the right-most eleven bits (e.g., bits 6–16) are the matrix location 262 of the changed bit.

At 254, a Receive Evaluation Register (RER) 264 is loaded by indexing the RCMR Matrix 256 with RCMR Index 266. For example, a table to register (T>R) function block loads the contents of the RCMR Matrix 256 into RER 264 stepwise at the rate of one register per scan. An internal coil is set when that function block has indexed. Next, at 268, the RER 264 contains one of the RCMRs (e.g., RCMR1) from the RCMR Matrix 256. At 268, bit 1 of the current RCMR is extracted and indicates the new set or reset state of the matrix location of the changed bit. For example, two bit rotate (BROT) function blocks are employed. A first BROT function block rotates the register contents of the RER 264 to the left by one bit while wrapping bit 1 to the position formerly occupied by bit 16. The rotated register is saved as Receive Manipulation Register1 (RMR1) 270. The second BROT function block rotates the register contents of RMR1 270 to the right by one bit. The exit bit, bit 16, is dropped during this rotation. The rotated register is saved as RMR2 272. A first internal coil is set upon completion of the second BROT function block, while a second internal coil is set if the exit bit, bit 16, is set or one. That second coil then reflects the state of bit 1 of the current RCMR (e.g., RCMR1).

Next, at 274, it is determined whether bit 1 of the current RCMR is set or reset. That determines the value of the changed bit location relative to the RMR2 272 register, which points to the matrix location (indexed by bit) of the bit needing to be updated. For example, the second coil of 268 is employed for that purpose along with two modify bit (MBIT) function blocks. The first MBIT function block, at 276, sets the corresponding bit 280 in a Field Change Message Update Table (FCMUT) 282 (as shown in FIG. 7B) if the exit bit trigger is set. The second MBIT function block, at 278, resets that corresponding bit in the FCMUT 282 if the exit bit trigger is reset. An internal coil is set upon execution of the bit modification.

At 284, it is determined whether register RSRCOUNT3 232, which contains the count of changes to be evaluated, is equal to register RSRCOUNT4 234, which contains the count of changes evaluated. If not, then execution resumes at 254. Otherwise, execution continues at 224. For example, at 284, an AD 16 function block indices register RSRCOUNT4 234 at the rate of once per scan. A TEST function block is then employed to test register RSRCOUNT4 234 against register RSRCOUNT3 232 and to direct the logic to either 224 or 254.

At 224, the FCMUT 282 is conditionally overwritten by a Full System Update (FSU) Matrix 285, which originates directly at the master PLC 52. The slave PLC 54 receives that information from the words following the Receive Status Word 286 of the message 62. However, the overwrite only occurs when full update (F) bit 288 of the Receive Status Word 286 has been detected as set at 220 (e.g., the coil thereof is set by bit 10 of the Receive Status Word 286). For example, a block move (BLKM) function is triggered by the true state of that coil. Next, at 290, data in the FCMUT 282 is transferred to the Distant End Input Coil (DEIC) Matrix 134 (FIG. 3A). For example, another BLKM function block is employed for the transfer, after which an internal coil is set to indicate that the inputs from the master PLC 52 have updated the data matrix that manipulates the field controls.

Next, at 292, the RCMR Matrix 256 is zeroed. For example, in response to the coil which is set at 290, a table to register (T>R) function block is employed to load zero to each of the registers of the RCMR Matrix 256 stepwise at the rate of one register per scan. Also, the RCMR Index 266 is returned to its initial state (i.e., at the top of the RCMR Matrix 256).

Finally, at 294, the register RSRCOUNT3 232, which contains the count of changes to be evaluated, is zeroed, before execution resumes at 212. This step ensures that the DECIPHER algorithm 124 will not be executed prior to a subsequent update of data from the master PLC 52. For example, in response to the coil, which is set at 290, an addition (AD16) function block is employed to zero that register. The return, after steps 250 or 294 to step 212, signifies a new scan of the PLC.

Although the invention has been described in terms of the communication of exemplary values, such as bits, it will be appreciated that the invention is applicable to the communication of a wide range of values (e.g., without limitation, nibbles, bytes, words, 32-bit words, floating point values).

The present invention improves the performance of the communication ink between the exemplary communication devices 4,6, and master and slave PLCs 52,54, by avoiding the unnecessary transfer of static data. By employing relatively shorter length data packets, improved data throughput is provided.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A communication system comprising:
   a first communication device including:
      first memory means for storing first information,
      first processor means (a) for repetitively determining a plurality of values as at least some of said first information, (b) for determining a count of any of said values which changed after a previous determination of said values, and (c) for alternatively selecting for communication in a message, as a function of said count, either (i) all of said values, or (ii) said any of said values, and
      first communication means for communicating said message;
   a second communication device including:
      second memory means for storing second information,
      second communication means for communicating said message, and
      second processor means (a) for alternatively updating said stored second information with either (i) all of said values, or (ii) said any of said values of said message, and (b) for processing at least some of said stored second information of said second memory means; and
   a communication channel between said first and second communication means.

2. The communication system of claim 1, wherein said first communication device is a master communication device; wherein said second communication device is a slave communication device; and wherein said first communication means sends said message to said second communication means over said communication channel.

3. The communication system of claim 2, wherein said master and slave communication devices are master and slave programmable logic controllers (PLCs).

4. The communication system of claim 1,
   wherein said values are a plurality of first values;
   wherein said message is a first message;
   wherein said second processor means includes:
      means for determining a plurality of second values,
      means for determining whether any of said second values has changed,
      means for alternatively selecting for communication with a second message either (i) all of said second values, or (ii) said any of said second values, and
      means for processing (for control) at least some of said stored second information;
   wherein said first communication means includes means for sending said first message to said second communication means, and means for receiving said second message from said second communication means;
   wherein said second communication means includes means for sending said second message to said first communication means, and means for receiving said first message from said first communication means; and
   wherein said first processor means includes:
      means for alternatively updating said stored first information with either (i) all of said second values, or (ii) said any of said second values, and
      means for processing at least some of said stored first information.

5. The communication system of claim 4, wherein said first processor means further includes means for periodically updating said stored first information with said all of said second values.

6. The communication system of claim 4, wherein said second processor means further includes means for determining whether greater than a predetermined count of said second values has changed, and means for informing said first processor means that greater than the predetermined count of said second values has changed.

7. The communication system of claim 6, wherein said first processor means further includes means for requesting all of said second values after being informing by said second processor means that greater than the predetermined count of said second values has changed; and wherein said second processor means further includes means for sending said first processor means said all of said second values in a subsequent second message.

8. The communication system of claim 6, wherein said second processor means further includes means for preparing said second message including a status indicating that greater than the predetermined count of said second values has changed.

9. The communication system of claim 8, wherein said second processor means further includes means for preparing said second message including a count of said second values which have changed, and said any of said second values.

10. A communication system comprising:
   a first programmable logic controller including:
      first memory means for storing first information,
      first processor means (a) for repetitively determining a plurality of values as at least some of said first information, (b) for determining which ones of said values changed after a previous determination of said values, and (c) for selecting for communication in a message said ones of said values which changed, and
      first communication means for communicating said message;
   a second programmable logic controller including:
      second memory means for storing second information,
      second communication means for communicating said message, and
      second processor means (a) for updating said stored second information with said ones of said values which changed, and (b) for processing at least some of said stored second information of said second memory means; and
   means for communicating information between said first and second communication means.

11. The communication system of claim 10, wherein said first processor means includes means for alternatively selecting for communication with said message either (i) all of said values, or (ii) said ones of said values which changed; and wherein said second processor means includes means for alternatively updating said stored second information with either (i) all of said values, or (ii) said ones of said values which changed of said message.

12. The communication system of claim 10, wherein said first programmable logic controller is a master programmable logic controller; wherein said second programmable logic controller is a slave programmable logic controller; and wherein said first communication means sends said message to said second communication means by employing said means for communicating information.

13. The communication system of claim 10,
   wherein said values are a plurality of first values;
   wherein said message is a first message;
   wherein said second processor means includes:
      means for determining a plurality of second values,
      means for determining whether any of said second values has changed,
      means for selecting for communication with a second message said any of said second values, and
      means employing at least some of said stored second information for control;
   wherein said first communication means includes means for sending said first message to said second communication means, and means for receiving said second message from said second communication means;
   wherein said second communication means includes means for sending said second message to said first communication means, and means for receiving said first message from said first communication means; and
   wherein said first processor means includes:
      means for updating said stored first information with said any of said second values, and
      means employing at least some of said stored first information for display.

14. The communication system of claim 13, wherein said first processor means further includes means for alternatively updating said stored first information with either (i) all of said second values, or (ii) said any of said second values.

15. The communication system of claim 14, wherein said first processor means further includes means for periodically updating said stored first information with said all of said second values.

16. The communication system of claim 13, wherein said second processor means further includes means for sending said second message in response to said first message.

17. The communication system of claim 13, wherein said second processor means further includes means for determining whether greater than a predetermined count of said second values has changed, and means for informing said first processor means that greater than the predetermined count of said second values has changed.

18. The communication system of claim 17, wherein said first processor means further includes means for requesting all of said second values after being informing by said second processor means that greater than the predetermined count of said second values has changed; and wherein said second processor means further includes means for sending said first processor means said all of said second values in a subsequent second message.

19. The communication system of claim 17, wherein said second processor means further includes means for preparing said second message including a status indicating that greater than the predetermined count of said second values has changed.

20. The communication system of claim 19, wherein said second processor means further includes means for preparing said second message including a count of said second values which have changed, and said any of said second values.

21. The communication system of claim 17, wherein said predetermined count is about ten.

22. The communication system of claim 10, wherein said means for communicating information includes a first modem communicating with said first communication means, a second modem communicating with said second communication means, and a communication line electrically connected between said first and second modems.

* * * * *